(12) United States Patent
Shi et al.

(10) Patent No.: US 10,728,801 B2
(45) Date of Patent: Jul. 28, 2020

(54) DATA PROCESSING METHOD AND APPARATUS FOR LTE AND WLAN AGGREGATION AND COMMUNICATIONS SYSTEM

(71) Applicant: FUJITSU LIMITED, Kawasaki-shi, Kanagawa (JP)

(72) Inventors: Yulong Shi, Beijing (CN); Haibo Xu, Beijing (CN); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/848,617

(22) Filed: Dec. 20, 2017

(65) Prior Publication Data
US 2018/0132135 A1 May 10, 2018

Related U.S. Application Data

(63) Continuation of application No. PCT/CN2015/084091, filed on Jul. 15, 2015.

(51) Int. Cl.
*H04W 84/04* (2009.01)
*H04W 28/06* (2009.01)
(Continued)

(52) U.S. Cl.
CPC ......... *H04W 28/065* (2013.01); *H04L 1/1607* (2013.01); *H04L 1/1848* (2013.01);
(Continued)

(58) Field of Classification Search
CPC . H04W 28/065; H04W 80/08; H04W 84/045; H04W 84/12
See application file for complete search history.

(56) References Cited

U.S. PATENT DOCUMENTS

| 2006/0056448 A1* | 3/2006 | Zaki ................... H04W 36/0066 370/466 |
| 2008/0205345 A1* | 8/2008 | Sachs ................ H04W 36/0011 370/332 |

(Continued)

FOREIGN PATENT DOCUMENTS

| CN | 102547848 A | 7/2012 |
| CN | 102984773 A | 3/2013 |

(Continued)

OTHER PUBLICATIONS

International Search Report issued for corresponding International Patent Application No. PCT/CN2015/084091, dated Mar. 24, 2016, with an English translation.

(Continued)

*Primary Examiner* — Chi Ho A Lee
(74) *Attorney, Agent, or Firm* — Myers Wolin, LLC

(57) ABSTRACT

A data processing method and apparatus for LTE and WLAN aggregation and a communications system. The data processing method includes: receiving, by a WLAN termination in a WLAN link, data transmitted by a PDCP layer in an LTE link, and transmitting the data transmitted by the PDCP layer to an LLC layer in the WLAN link after processing; and feeding back highest successfully delivered PDCP sequence number information and/or unsuccessfully delivered PDCP sequence number information to the PDCP layer in the LTE link. Hence, a problem that an LLC layer is unable to provide transmission status indication necessary to a PDCP layer may be effectively solved.

19 Claims, 4 Drawing Sheets

201 a WT in a WLAN link receives data transmitted by a PDCP layer in an LTE link, and transmits the data transmitted by the PDCP layer to an LLC layer in the WLAN link after processing

202

The WT feeds back highest successfully delivered PDCP sequence number information and/or unsuccessfully delivered PDCP sequence number information to the PDCP layer in the LTE link

(51) Int. Cl.
*H04L 1/18* (2006.01)
*H04L 12/801* (2013.01)
*H04L 1/16* (2006.01)
*H04L 5/00* (2006.01)
*H04W 72/12* (2009.01)
*H04W 80/04* (2009.01)
*H04W 80/08* (2009.01)
*H04W 80/02* (2009.01)
*H04W 84/12* (2009.01)

(52) U.S. Cl.
CPC ............ *H04L 5/0053* (2013.01); *H04L 47/34* (2013.01); *H04W 72/1215* (2013.01); *H04W 80/045* (2013.01); *H04W 80/08* (2013.01); *H04W 80/02* (2013.01); *H04W 84/045* (2013.01); *H04W 84/12* (2013.01)

(56) References Cited

U.S. PATENT DOCUMENTS

| | | | | |
|---|---|---|---|---|
| 2009/0103478 | A1* | 4/2009 | Sammour | H04L 1/1874 370/328 |
| 2013/0294379 | A1 | 11/2013 | Guo et al. | |
| 2014/0029553 | A1* | 1/2014 | Li | H04W 72/082 370/329 |
| 2014/0199963 | A1 | 7/2014 | Mohebbi | |
| 2014/0293970 | A1 | 10/2014 | Damnjanovic et al. | |
| 2015/0048913 | A1* | 2/2015 | Fullerton | H01F 7/0284 335/306 |
| 2015/0131552 | A1 | 5/2015 | He | |
| 2015/0264726 | A1* | 9/2015 | Zhu | H04W 28/065 370/329 |
| 2016/0057055 | A1* | 2/2016 | Barrett | H04L 45/74 370/329 |
| 2016/0323823 | A1* | 11/2016 | Ryoo | H04W 52/0229 |
| 2016/0337254 | A1* | 11/2016 | Karaki | H04L 47/283 |
| 2016/0337916 | A1* | 11/2016 | Deenoo | H04W 8/22 |
| 2017/0041100 | A1* | 2/2017 | Xie | H04L 1/00 |
| 2018/0035436 | A1* | 2/2018 | Sharma | H04W 72/085 |

FOREIGN PATENT DOCUMENTS

| | | |
|---|---|---|
| CN | 103582010 A | 2/2014 |
| CN | 103888215 A | 6/2014 |

OTHER PUBLICATIONS

Written Opinion of the International Searching Authority issued for corresponding International Patent Application No. PCT/CN2015/084091, dated Mar. 24, 2016, with an English translation.

First Notification of Office Action issued by the China National Intellectual Property Administration for corresponding Chinese Patent Application No. 201580080655.7, dated Apr. 28, 2020, with an English translation.

Ericsson, "User plane for LTE-WLAN aggregation", Agenda Item: 7.6.2.1, 3GPP TSG-RAN WG2 Meeting #90, R2-152604, Fukuoka, Japan, May 25-29, 2015.

Huawei et al., "Details of the GTP-U solution for LTE-WLAN aggregation", Agenda Item: 7.6.2.2, 3GPP TSH-RAN WG2 Meeting #90, R2-152657, Fukuoka, Japan, May 25-29, 2015.

* cited by examiner

| D/S | LCID | Bearer SN | Oct 1 |
| Bearer SN (cont.) | | | Oct 2 |
| Data | | | Oct 3 |
| .... | | | |

Fig. 3

| D/S | LCID | Bearer ACK SN | Oct 1 |
| Bearer ACK SN (cont.) | | | Oct 2 |
| E | LCID | Bearer ACK SN | Oct 3 |
| Bearer ACK SN (cont.) | | | Oct 4 |
| E | ... | | Oct 5 |
| ... | | | Oct 6 |

Fig. 4

| D/S | LCID | Bearer ACK SN | Oct 1 |
| Bearer ACK SN (cont.) | | | Oct 2 |
| NACK | E | LCID | |
| Bearer ACK SN | | | |
| | NACK | E | ... |
| ... | | | |

Fig. 5

DATA PROCESSING METHOD AND APPARATUS FOR LTE AND WLAN AGGREGATION AND COMMUNICATIONS SYSTEM

CROSS REFERENCE TO RELATED APPLICATIONS

This application is a continuation application of International Application PCT/CN2015/084091 filed on Jul. 15, 2015, the entire contents of which are incorporated herein by reference.

TECHNICAL FIELD

This disclosure relates to the field of communications technologies, and in particular to a data processing method and apparatus for long-term evolution (LTE) and wireless local area network (WLAN) aggregation and a communications system.

BACKGROUND

WLAN is a wireless local area network communications technology operating at an unauthorized band, and has a very high data transmission rate. LTE is a cellular communications technology operating at an authorized band, and may provide reliable and high-efficiency wireless communications for mobile user equipments. As increase of the number of smart user equipments, the amount of traffic data of the user equipment tends to increase tremendously. Especially in hotspot areas, as the amount of traffic data is giant and demands for traffics (for example denoted by bearers) are complex and varied, challenges are brought to existing LTE systems.

An LTE and WLAN aggregation system is under study in the 3rd Generation Partnership Project (3GPP), in which is expected that wireless resources of a WLAN system operating at an unauthorized band and an LTE system operating at an authorized band may be aggregated, so that the both systems may provide services for user equipments at the same time, and user experiences may be improved.

FIG. 1 is a schematic diagram of an architecture of a protocol stack of an LTE and WLAN aggregation system, in which a case of downlink is shown. As shown in FIG. 1, the aggregation system mainly includes three parts: a base station (such as an eNB) at an LTE network side, an access point (AP) at a WLAN network side, and a user equipment (UE). The eNB mainly carries out an LTE protocol stack, the AP mainly carries out a WLAN protocol stack, and the UE has protocol stacks of LTE and WLAN at the same time.

The LTE protocol stacks at the eNB side and the UE side mainly include the following protocol layers: a packet data convergence protocol (PDCP) layer, a radio link control (RLC) layer, and an LTE media access control (MAC) layer. And the WLAN protocol stacks at the AP side and the UE side mainly include the following protocol layers: a logical link control (LLC) layer, and an IEEE 802.11 MAC layer.

For example, a logical node connecting LTE and WLAN is defined as a WLAN termination (WT) in the 3GPP. And the WT is mainly responsible for interaction of the two protocols and processing of user plane data packets.

The above aggregation system may simultaneously carry multiple traffics (such as bearers) of the same UE. The system establishes an individual PDCP layer entity respectively in the eNB and the UE for each traffic. As shown by the arrow in FIG. 1, data of a PDCP protocol data unit (PDU) of the same traffic may be split into two data streams in the PDCP layer, which are simultaneously transmitted in an LTE link and a WLAN link. And data of multiple traffics which are branched into the WLAN link is carried by a unique LLC layer entity and an MAC layer entity.

The WT is a logical node defined in the 3GPP, and interior of which may be achieved by multiple protocol layers or multiple functional modules. A physical position the WT may be in an AP, or may be independent from an AP. The WT performs processing on a PDCP PDU issued by a PDCP layer, and delivers the processed data to an LLC layer. The WT needs further to accomplish functions of multiplexing and demultiplexing for data of multiple traffics in an LLC entity. And furthermore, the WT should provide some feedback information to the PDCP layer, characterizing a transmission situation of the PDCP PDU in the WLAN link, so that the PDCP layer determines a scheme for data stream division and forwarding and performs traffic controlling.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In an LTE and WLAN aggregation system, each PDCP entity carries a traffic and determines data stream situations of the traffic in two links. A PDCP layer determines whether each PDCP PDU is forwarded to an RLC layer in an LTE link or is forwarded to an LLC layer in a WLAN link via a WT. The PDCP layer makes related decisions depending on data transmission situations in the LTE link or the WLAN link fed back by a lower layer protocol.

On the one hand, the PDCP layer needs the lower layer protocol to feed back "a highest successfully delivered PDCP SN (sequence number)". In assembling a PDCP PDU, the PDCP layer numbers each PDU and grants a PDCP SN for it. In order to avoid that hyper frame numbers (HFNs) of a transmitting side and a receiving side lose synchronization, in the PDCP PDU delivered by the PDCP layer to a lower layer, the number of PDCP SNs that have not been successfully received by the receiving side should not exceed a half of a total space of SNs. Hence, a sum of the highest successfully delivered PDCP SN and a half of a total space of SNs is an upper limit of PDCP layers that currently can be numbered. If an SN of a PDCP PDU is greater than this value, it should not be delivered to the lower layer.

And on the other hand, the PDCP needs the lower layer protocol or a receiving side to feed back a PDCP SN failed in being retransmitted many times (if any), so as to perform possible operations, such as retransmission, or link reestablishment, etc.

However, it was found by the inventor that in the existing architecture of a protocol stack shown in FIG. 1, the LLC layer in the WLAN link is unable to provide the above two pieces of information. As provided in IEEE 802.2, an LLC layer will not definitely indicate to an upper layer protocol information on whether an LLC service data unit (SDU) is successfully transmitted. Hence, a function needs to be designed independently in a WT to provide related feedback information to the PDCP layer, the information mainly including a case of whether a PDCP PDU in the WLAN link is successfully transmitted.

Embodiments of this disclosure provide a data processing method and apparatus for LTE and WLAN aggregation and a communications system, in which data transmission between a PDCP layer and an LLC layer is achieved by a WT, and a case of data transmission in a WLAN link is fed back by the WT to the PDCP layer.

According to a first aspect of the embodiments of this disclosure, there is provided a data processing method for LTE and WLAN aggregation, including:

receiving, by a WLAN termination in a WLAN link, data transmitted by a PDCP layer in an LTE link, and transmitting the data transmitted by the PDCP layer to an LLC layer in the WLAN link after processing; and feeding back highest successfully delivered PDCP sequence number information and/or unsuccessfully delivered PDCP sequence number information to the PDCP layer in the LTE link.

According to a second aspect of the embodiments of this disclosure, there is provided a data processing apparatus for LTE and WLAN aggregation, including:

a data transmitting unit configured to receive data transmitted by a PDCP layer in an LTE link, and transmit the data transmitted by the PDCP layer to an LLC layer in the WLAN link after processing; and an information feedback unit configured to feed back highest successfully delivered PDCP sequence number information and/or unsuccessfully delivered PDCP sequence number information to the PDCP layer in the LTE link.

According to a third aspect of the embodiments of this disclosure, there is provided a communications system for LTE and WLAN aggregation, including:

a base station configured to perform communications with a UE and a WLAN access point;

the WLAN access point configured to perform communications with the UE according to a WLAN protocol, the WLAN access point comprising a first WT interacting with an LTE link; wherein after receiving data transmitted by a PDCP layer in the base station, the first WT feeds back highest successfully delivered PDCP sequence number information and/or unsuccessfully delivered PDCP sequence number information to the PDCP layer; and the UE configured to perform communications with the base station according to an LTE protocol and perform communications with the WLAN access point according to a WLAN protocol, the UE comprising a second WT interacting with the LTE link; wherein after receiving data transmitted by a PDCP layer in the UE, the second WT feeds back highest successfully delivered PDCP sequence number information and/or unsuccessfully delivered PDCP sequence number information to the PDCP layer.

According to another aspect of the embodiments of this disclosure, there is provided a computer readable program code, which, when executed in a WLAN access point or a UE, will cause a computer unit to carry out the data processing method for LTE and WLAN aggregation as described above in the WLAN access point or the UE.

According to a further aspect of the embodiments of this disclosure, there is provided a computer readable medium, including a computer readable program code, which will cause a computer unit to carry out the data processing method for LTE and WLAN aggregation as described above in a WLAN access point or a UE.

An advantage of the embodiments of this disclosure exists in that in the LTE and WLAN aggregation system, the highest successfully delivered PDCP SN is provided to the PDCP entity, so as to avoid that the PDCP entity transmits PDCP PDUs of a number exceeding a half of the number of SN spaces. And at the same time, indication on loss of PDCP PDUs may be provided, so as to detect data loss and link failure, thereby efficiently solving a problem that an LLC layer is unable to provide transmission status indication necessary to a PDCP layer.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 3 is a schematic diagram of an adaptation data PDU of Embodiment 1 of this disclosure;

FIG. 4 is a schematic diagram of an adaptation status PDU of Embodiment 1 of this disclosure;

FIG. 5 is another schematic diagram of the adaptation status PDU of Embodiment 1 of this disclosure;

DETAILED DESCRIPTION OF THE DISCLOSURE

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

The embodiment of this disclosure provides a data processing method for LTE and WLAN aggregation, applicable to a system where an LTE link and a WLAN link are aggregated. The embodiment of this disclosure shall be described from a WT side in an AP, and a WT in a UE or a WT independent from the AP shall not be described, as their cases are similar thereto.

Figure 1:
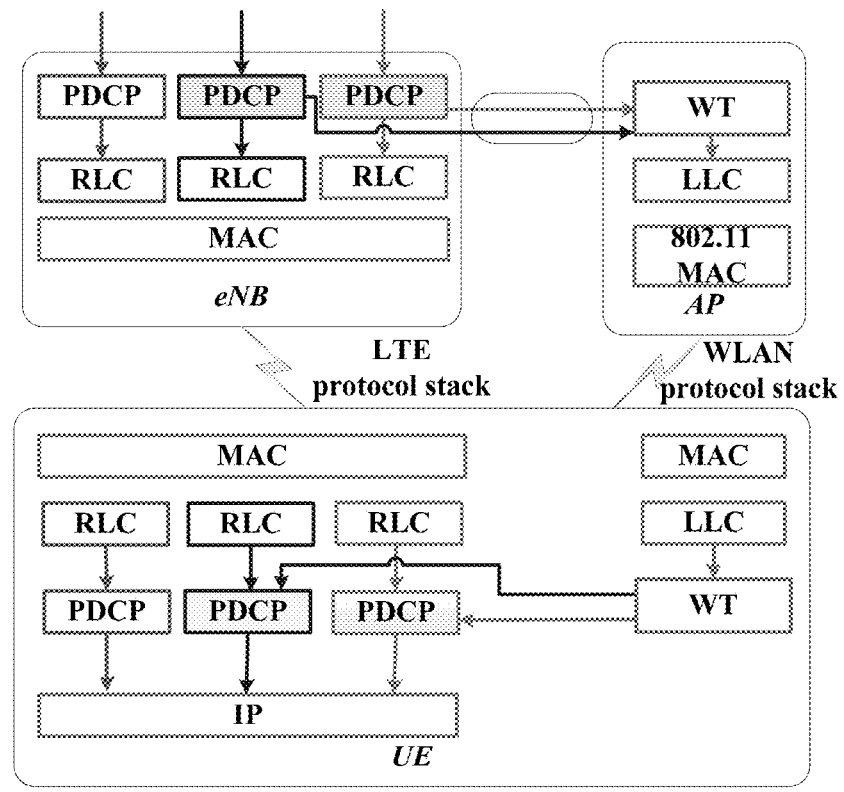
FIG. 1 is a schematic diagram of an architecture of a protocol stack of an LTE and WLAN aggregation system.
Figure 2:
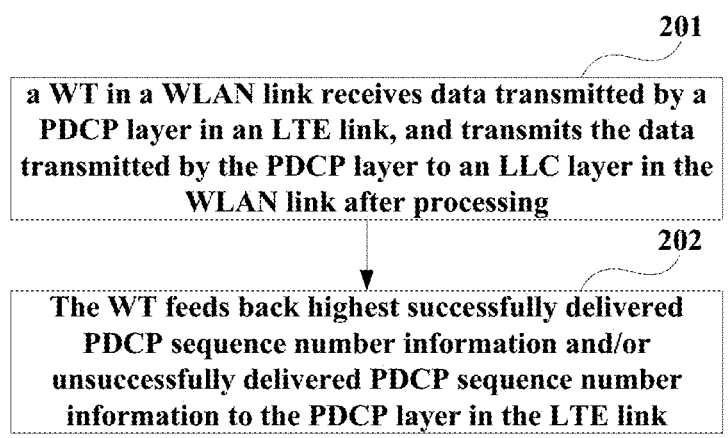
FIG. 2 is a flowchart of the data processing method for LTE and WLAN aggregation of Embodiment 1 of this disclosure.

FIG. 2 is a flowchart of the data processing method for LTE and WLAN aggregation of the embodiment of this disclosure. As shown in FIG. 2, the method includes:

block 201: a WLAN termination (WT) in a WLAN link receives data transmitted by a PDCP layer in an LTE link, and transmits the data transmitted by the PDCP layer to an LLC layer in the WLAN link after processing; and block 202: the WT in the WLAN link feeds back highest successfully delivered PDCP sequence number information and/or unsuccessfully delivered PDCP sequence number information to the PDCP layer in the LTE link.

In this embodiment, the WT in the WLAN link performs the data transmission and information feedback by using an adaptation layer. For example, for some traffics having no higher requirements on service quality, an existing transmission function of the LLC layer may be used, and necessary functions of feedback to an upper layer only in the WT are configured by using the adaptation layer.

In this embodiment, the WT should, according to QoS (quality of service) parameters of a traffic, indicate transmission types to the LLC layer, including Type 1, Type 2 and Type 3, adopted by the LLC layer in transmitting data of the traffic, and respectively set up peer adaptation layers in the WTs at a network side and a UE side.

In this embodiment, two types of PDUs, an adaption data PDU and an adaption status PDU, may be used; for example, the adaption status PDU may be classified into an adaption status PDU with NACK and an adaption status PDU without NACK.

In this embodiment, the adaption data PDU may include a logical channel identifier of a traffic, an adaptation layer sequence number of the traffic and data of the traffic; for example, an adaptation layer sequence number of each of the traffics is independently numbered. Furthermore, the adaption data PDU may include a D/S field denoting whether it is an adaption status PDU or an adaption data PDU.

FIG. 3 is a schematic diagram of the adaptation data PDU of the embodiment of this disclosure. As shown in FIG. 3, meanings of fields of data formats of the adaptation data PDU are expressed as follows:

TABLE 1

D/S: a length is, for example, 1 bit, denoting whether the PDU is an adaption data PDU or an adaption status PDU; for example, "1" denotes that the PDU is an adaptation data PDU, and "0" denotes that the PDU is an adaptation status PDU.
LCID: that is, a logical channel ID, a length is, for example, 5 bits, denoting an ID of a logical channel to which a traffic pertains.

TABLE 1-continued

Bearer SN: a length is, for example, 10 bits, denoting a bearer-specific adaptation SN; the field denotes an SN of each traffic that is independently numbered, and the traffics are independent of each other, and are not uniformly numbered.
Data: denotes data of the traffic.

In this embodiment, the adaption status PDU may include a logical channel identifier of a traffic and a currently highest successfully delivered adaptation layer sequence number of the traffic; and it may further include an E field denoting whether there exist status reports of other traffics and a D/S field denoting whether the PDU is an adaptation data PDU or an adaptation status PDU.

Or, the adaptation status PDU may include a logical channel identifier of a traffic, a currently highest successfully delivered adaptation layer sequence number of the traffic and an NACK field denoting that at least one PDU is unsuccessfully transmitted; and it may further include an E field denoting whether there exist status reports of other traffics and a D/S field denoting whether the PDU is an adaptation data PDU or an adaptation status PDU.

For example, the adaptation status PDU may include status reports of one or more traffics, the one or more traffics being traffics that is/are changed after feeding back the highest successfully delivered adaptation layer sequence number.

FIG. 4 is a schematic diagram of the adaptation status PDU of the embodiment of this disclosure, in which a case without the NACK filed is shown; and FIG. 5 is another schematic diagram of the adaptation status PDU of the embodiment of this disclosure, in which a case with the NACK field is shown.

As shown in FIGS. 4 and 5, meanings of fields of data formats of the adaptation status PDU are expressed as follows:

TABLE 2

D/S: a length is, for example, 1 bit, denoting whether the PDU is an adaption data PDU or an adaption status PDU; for example, "1" denotes that the PDU is an adaptation data PDU, and "0" denotes that the PDU is an adaptation status PDU.
LCID: that is, a logical channel ID, a length is, for example, 5 bits, denoting an ID of a logical channel to which a traffic pertains.
Bearer ACK SN: a length is, for example, 10 bits, denoting a bearer-specific highest currently successfully delivered adaptation SN.
E: a length is, for example, 1 bit, denoting in the adaptation status PDU whether there exist status reports of other traffics after it; for example, "0" denotes that there exists no more status report of other traffics after it, i.e. end of the adaptation status PDU, and "1" denotes that there exists more status report of other traffic after it.
NACK: a length is, for example, 1 bit, denoting whether transmission of at least one PDU of a traffic fails after last status report;
for example, "1" denotes that loss of PDU exists between two status reports, and "0" denotes that loss of PDU does not exist between two status reports.

It should be noted that the adaptation status PDUs shown in FIGS. 4 and 5 do not necessarily exist at the same time, and one of them may be used; for example, the adaptation data PDU shown in FIG. 3 and the adaptation status PDU shown in FIG. 4 may be used, or the adaptation data PDU shown in FIG. 3 and the adaptation status PDU shown in FIG. 5 may be used.

This disclosure shall be described below respectively by taking data transmission and data reception as examples.

In data transmission, an adaptation layer receives PDCP PDUs delivered by an upper layer (i.e. a PDCP layer), encapsulates the PDCP PDUs to constitute an adaptation data PDU, and delivers the adaptation data PDU to a lower layer (i.e. an LLC layer) for transmission.

For example, it may include: receiving the data transmitted by the PDCP layer in the LTE link; encapsulating the data transmitted by the PDCP layer into an adaptation data PDU; and transmitting the adaptation data PDU to the LLC layer in the WLAN link.

And the method further includes: receiving an adaptation status PDU by the adaptation layer from the LLC layer in the WLAN link; obtaining logical channel identifiers and highest successfully delivered adaptation layer sequence numbers of one or more traffics from the adaptation status PDU; the adaptation layer sequence numbers correspond to the PDCP sequence number information; and feeding back the highest successfully delivered adaptation layer sequence numbers respectively to PDCP layers to which the logical channel identifiers of the one or more traffics correspond, or feeding back the highest successfully delivered adaptation layer sequence numbers and delivered failure information respectively to the PDCP layers to which the logical channel identifiers of the one or more traffics correspond.

Actions of the adaptation layer in data transmission shall be further described below.

For example, the adaptation layer in the WT may maintain following status variables:

$Bearer_i\_SN$: denoting an adaptation layer SN specific for an i-th traffic, such as corresponding to an i-th PDCP entity of the UE, which is set to be 0 when the entity is set up; and $Maximum\_Bearer_i\_SN$: denoting a maximum value of the adaptation layer SN specific for the i-th traffic, such as corresponding to the i-th PDCP entity of the UE, the value may be configured by a base station via high-layer signaling, such as radio resource control (RRC) signaling.

Examples are as shown in the table below:

TABLE 3

For each PDCP PDU delivered by an upper layer, the adaptation layer entity should:
  obtain a logical channel identifier (LCID) to which an upper layer PDCP entity corresponds;
  set a D/S field to be "1" to denote an adaptation data PDU;
  set an LCID field to be a logical channel identifier (LCID) of the traffic;
  determine that the PDU is an i-th traffic (i.e. bearer) of the UE according to the LCID;
  set the Bearer SN field to be a value of the variable $Bearer_i\_SN$;
  add 1 to the variable $Bearer_i\_SN$;
  if $Bearer_i\_SN > Maximum\_Bearer_i\_SN$,
    set $Bearer_i\_SN$ to be 0; and
  deliver an assembled adaptation data PDU to a lower layer.
For an adaptation status PDU received from the lower layer, the adaptation layer entity should:
  if adaptation status PDU without NACK is used:
    perform the following operations on each pair field of LCID and bearer ACK SN, until the E field is 0:
      transmit indication on a highest successfully delivered adaptation SDU to the PDCP entity to which the LCID field corresponds, a number of the SDU being denoted by the bearer ACK SN field;
  it should be noted that a correspondence between the PDCP SN and the adaptation SN specific for traffic of the adaptation layer may be reserved for manufacturers, and shall not be specified in this disclosure.
  if adaptation status PDU with NACK is used:
    perform the following operations on each pair field of LCID and bearer ACK SN, until the E field is 0:
      transmit indication on a highest successfully delivered adaptation SDU to the PDCP entity to which the LCID field corresponds, a number of the SDU being denoted by the bearer ACK SN field; and TABLE 3-continued if NACK field is 1:
      transmit an indication to the PDCP entity to which the LCID field corresponds, denoting that the SDU is not successfully received after being retransmitted multiple times by the lower layer.

The above adaptation status PDU may be constructed by an adaptation layer in the receiving side, and details are as described below.

In data reception, the adaptation layer receives the data transmitted by the LLC layer in the WLAN link, and transmits the data transmitted by the LLC layer to the PDCP layer in the LTE link after processing.

For example, it may include: receiving an adaptation data PDU by the adaptation layer from the LLC layer in the WLAN link; obtaining logical channel identifiers of the traffics from the adaptation data PDU; and processing the data in the adaptation data PDU, and transmitting the processed data to the PDCP layers to which the logical channel identifiers of the traffics correspond.

The method may further include: constructing a status PDU by the adaptation layer in a case where a preset timer does not operate or expires, and feeding back the status PDU to the LLC layer in the WLAN link. The timer is one specific for status report, and particular of which may refer to t-StatusProhibit described below.

And the method may further include: obtaining the adaptation layer sequence numbers of the traffics from the adaptation data PDU; and determining whether the adaptation layer sequence numbers of the traffics are consecutively received highest adaptation layer sequence numbers according to the adaptation layer sequence numbers of the traffics and prestored variables denoting highest successfully delivered sequence numbers of the traffics.

Actions of the adaptation layer in data reception shall be further described below.

For example, the adaptation layer in the WT may maintain following status variables:

$Bearer_i\_Successful\_SN$: denoting a highest successfully delivered adaptation layer SN specific for an i-th traffic, such as corresponding to an i-th PDCP entity of the UE;

$Bearer_i\_Update$: for example, "1" denotes that the i-th traffic receives new data after last time of status report, and "0" denotes that the i-th traffic receives no new data after last time of status report, that is, the highest successful SN of the traffic is not updated; and $Bearer_i\_NACK\_Update$: for example, "1" denotes that loss of a PDU occurs in the i-th traffic after last time of status report, and "0" denotes that loss of a PDU does not occur in the i-th traffic after last time of status report.

Furthermore, the adaptation layer in the WT may maintain following timer:

t-StatusProhibit: a value of the timer may be configured by the base station via RRC signaling, and the timer is used to control a period of the adaptation layer status report; if the RRC signaling sets the value of t-StatusProhibit to be 0 ms, the status report will be transmitted after each time of receiving each of the adaptation layer data; otherwise, the status report will be transmitted periodically.

In one implementation, the prestored variables are updated when the adaptation layer SN of the traffic is a consecutively received highest adaptation layer SN, and the prestored variables are not updated when the adaptation layer SN of the traffic is not a consecutively received highest adaptation layer SN.

Examples are as shown in the table below:

TABLE 4

For each adaptation data PDU delivered by a lower layer, the adaptation layer entity should:
   determine that the PDU is an i-th traffic (i.e. bearer) of the UE according to the LCID;
   if a value of the Bearer SN field is equal to Bearer$_i$_Successful_SN + 1:
     update the variable Bearer$_i$_Successful_SN into the value of the Bearer SN field;
     set Bearer$_i$_Update to be 1:
   deliver the adaptation SDU with a packet header of the adaptation layer being removed to a corresponding PDCP entity according to a value of the LCID;
For each adaptation data PDU delivered by a lower layer, the adaptation layer entity should:
   if the timer t-StatusProhibit does not operate or expires:
     construct an adaptation status PDU and deliver it to the lower layer, and in constructing the adaptation status PDU, the adaptation layer entity of the receiving side should:
     set a D/S field to be "0" to denote the adaptation status PDU;
     for each traffic (denoted by Bearer$_i$) of the UE, i is from 1 to the number of bearers configured by the UE:
       if Bearer$_i$_Update is "1":
         set LCID to be a logical channel ID of the i-th bearer;
         set Bearer ACK SN field to be Bearer$_i$_Successful_SN;
         set Bearer$_i$_Update to be "0";
     otherwise,
       after the timer t-StatusProhibit expires, construct an adaptation status PDU, and deliver it to the lower layer;
after an adaptation status PDU is delivered to the lower layer, the adaptation layer entity of the receiving side should:
restart the timer t-StatusProhibit.

In this implementation, the adaptation status PDU without NACK shown in FIG. 4 may be used. The adaptation layer may feed back the consecutively received highest adaptation layer SN in the adaptation status PDU. If loss of an SN occurs, the receiving side always waits for receiving the SN, and when a subsequent SN is received, the highest successfully delivered SN will not be updated. And the transmitting side may discover abnormality of a link according to that a highest successfully delivered SN of a traffic in the adaptation status PDU is not always updated.

In another implementation, the NACK field in the adaptation status PDU is set when the adaptation layer SN of the traffic is not the consecutively received highest adaptation layer SN.

Examples are as shown in the table below:

TABLE 5

For each adaptation data PDU delivered by a lower layer, the adaptation layer entity should:
   determine that the PDU is an i-th traffic (i.e. bearer) of the UE according to the LCID;
   if a value of the Bearer SN field is unequal to Bearer$_i$_Successful_SN + 1:
     set Bearer$_i$_NACK_Update to be "1";
   otherwise,
     set Bearer$_i$_NACK_Update to be "0";
   update the variable Bearer$_i$_Successful_SN into a value of the Bearer SN field;
   set Bearer$_i$_Update to be "1";
   deliver the adaptation SDU with a packet header of the adaptation layer being removed to a corresponding PDCP entity according to a value of the LCID;
For each adaptation data PDU delivered by a lower layer, the adaptation layer entity should:
   if the timer t-StatusProhibit does not operate or expires:
     construct an adaptation status PDU and deliver it to the lower layer, and in constructing the adaptation status PDU, the adaptation layer entity should:
     set a D/S field to be "0" to denote the adaptation status PDU;

TABLE 5-continued for each traffic (denoted by Bearer$_i$) of the UE, i is from 1 to the number of bearers configured by the UE:
       if Bearer$_i$_Update is "1" or Bearer$_i$_NACK_Update is "1":
         set LCID field to be a logical channel ID of the i-th bearer;
         set the Bearer ACK SN field to be Bearer$_i$_Successful_SN;
         set Bearer$_i$_Update to be "0";
       if Bearer$_i$_NACK_Update is "1":
         set the NACK field to be 1; and
         set Bearer$_i$_NACK_Update to be "0";
       otherwise,
         set the NACK field to be 0;
   otherwise,
     after the timer t-StatusProhibit expires, construct an adaptation status PDU, and deliver it to the lower layer;
after an adaptation status PDU is delivered to the lower layer, the adaptation layer entity of the receiving side should:
restart the timer t-StatusProhibit.

In this implementation, the adaptation status PDU with NACK shown in FIG. 5 may be used. The adaptation layer may feed back the non-consecutively received highest adaptation layer SN in the adaptation status PDU. If loss of an SN occurs, the receiving side informs a peer via the NACK field in the adaptation status PDU that loss of data occurs, and hence the peer discovers abnormality of a link. And the highest successfully delivered SN will be updated when a subsequent SN is received.

In another implementation, when the adaptation layer SN of the traffic is not the consecutively received highest adaptation layer SN, data loss information is fed back or a WLAN link failure report procedure is initiated via high-layer signaling.

Examples are as shown in the table below:

TABLE 6

For each adaptation data PDU delivered by a lower layer, the adaptation layer entity should:
   determine that the PDU is an i-th traffic (i.e., bearer) of the UE according to the LCID;
   if a value of the Bearer SN field is unequal to Bearer$_i$_Successful_SN + 1:
     deem that the WLAN link fails; and
     indicate the base station via RRC signaling or indicate the base station by initiating a WLAN link failure report procedure (including transmitting RRC signaling) that loss of data occurs in the bear of the WLAN link;
   update the variable Bearer$_i$_Successful_SN into a value of the Bearer SN field;
   set Bearer$_i$_Update to be "1";
   deliver the adaptation SDU with a packet header of the adaptation layer being removed to a corresponding PDCP entity according to a value of the LCID;
For each adaptation data PDU delivered by a lower layer, the adaptation layer entity should:
   if the timer t-StatusProhibit does not operate or expires:
     construct an adaptation status PDU and deliver it to the lower layer, and in constructing the adaptation status PDU, the adaptation layer entity should:
     set a D/S field to be "0" to denote the adaptation status PDU;
     for each traffic (denoted by Bearer$_i$) of the UE, i is from 1 to the number of bearers configured by the UE:
       if Bearer$_i$_Update is "1":
         set LCID field to be a logical channel ID of the i-th bearer;
         set the Bearer ACK SN field to be Bearer$_i$_Successful_SN;
         set Bearer$_i$_Update to be "0";
   otherwise,
     after the timer t-StatusProhibit expires, construct an adaptation status PDU, and deliver it to the lower layer;
after an adaptation status PDU is delivered to the lower layer, the adaptation layer entity of the receiving side should:
restart the timer t-StatusProhibit.

In this implementation, the adaptation status PDU without NACK shown in FIG. 4 may be used. The adaptation layer may feed back the non-consecutively received highest adaptation layer SN in the adaptation status PDU. If loss of an SN occurs, the receiving side informs the base station via RRC signaling that abnormality of a link is discovered. And the highest successfully delivered SN will be updated when a subsequent SN is received.

It should be noted that the above description is given from the aspects of data transmission and data reception. And in particular implementation, the adaptation layer in the transmitting side and the adaptation layer in the receiving side may be used in a combined manner, and details shall not be described herein any further.

It can be seen from the above embodiment that in the LTE and WLAN aggregation system, the highest successfully delivered PDCP SN is provided to the PDCP entity, so as to avoid that the PDCP entity transmits PDCP PDUs of a number exceeding a half of the number of SN spaces. And at the same time, indication on loss of PDCP PDUs may be provided, so as to detect data loss and link failure, thereby efficiently solving a problem that an LLC layer is unable to provide transmission status indication necessary to a PDCP layer.

Embodiment 2

The embodiment of this disclosure provides a data processing method for LTE and WLAN aggregation, applicable to a system where an LTE link and a WLAN link are aggregated. What is different from Embodiment 1 is that a WT in the embodiment of this disclosure performs data transmission and information feedback by using an RLC layer.

In this embodiment, a WT at a network side and a WT at a UE side may internally set up corresponding RLC entities for some traffics (i.e. PDCP entities). Furthermore, some traffics may be permitted to adopt the scheme in Embodiment 1, that is, some traffics may be permitted not to be configured with corresponding RLC entities.

In data transmission, an RLC entity receives PDCP PDUs delivered by an upper layer, encapsulates them into RLC PDUs, and delivers them to a lower layer for transmission. In data reception, an RLC entity receives RLC PDUs delivered by a lower layer, delivers them to a PDCP layer after processing, and indicates a currently highest successfully delivered PDCP SN and/or a transmission failed PDCP SN, etc., to the PDCP layer. Such indication is defined in an RLC protocol, and needs not be defined individually.

In this embodiment, the WT at the network side and the WT at the UE side are configured with entities and parameters of the RLC layer at the same time.

For example, in configuring LTE and WLAN aggregation, a base station may indicate via an interface (such as an Xw interface) to the WT at the network side that traffics (i.e. bearers) of the RLC entity should be configured at the WT, and configure parameters of a designated RLC entity; and at the same time, the base station indicates via RRC signaling of a Uu interface, for example, that traffics (i.e. bearers) of the RLC entity are configured in a WLAN link of the UE, and configures parameters of a designated RLC entity.

In this embodiment, one or more traffics in the WLAN link is/are configured to use functions of the RLC layer, that is, some traffics (for example, which traffics) may be configured with RLC layers.

In this embodiment, for some traffics having higher requirements on quality of service, the base station may determine functions of retransmission, and re-sorting, etc., of the LLC layer may not be depended on, and configure that the WTs have an extra transmission function guaranteeing quality of transmission.

It can be seen from the above embodiment that in the LTE and WLAN aggregation system, the highest successfully delivered PDCP SN is provided to the PDCP entity, so as to avoid that the PDCP entity transmits PDCP PDUs of a number exceeding a half of the number of SN spaces. And at the same time, indication on loss of PDCP PDUs may be provided, so as to detect data loss and link failure, thereby efficiently solving a problem that an LLC layer is unable to provide transmission status indication necessary to a PDCP layer.

Embodiment 3

The embodiment of this disclosure provides a data processing apparatus, configured in a system where an LTE link and a WLAN link are aggregated, with contents identical to those in embodiments 1 and 2 being not going to be described herein any further.

Figure 6:
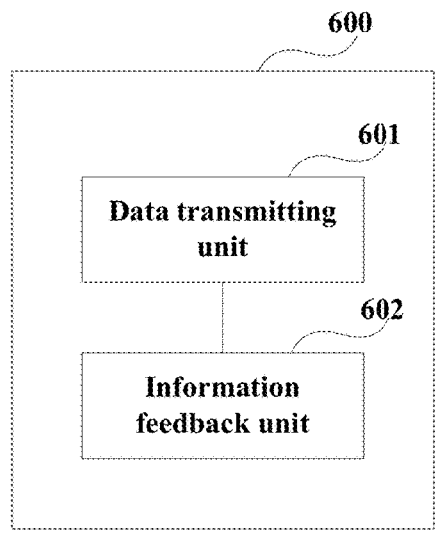
FIG. 6 is a schematic diagram of the data processing apparatus for LTE and WLAN aggregation of Embodiment 3 of this disclosure.

FIG. 6 is a schematic diagram of the data processing apparatus of the embodiment of this disclosure. As shown in FIG. 6, the data processing apparatus 600 includes:

a data transmitting unit 601 configured to receive data transmitted by a PDCP layer in an LTE link, and transmit the data transmitted by the PDCP layer to an LLC layer in the WLAN link after processing; and an information feedback unit 602 configured to feed back highest successfully delivered PDCP sequence number information and/or unsuccessfully delivered PDCP sequence number information to the PDCP layer in the LTE link.

In one implementation, the data processing apparatus 600 may carry out functions of the data transmitting unit 601 and the information feedback unit 602 by using an adaptation layer, so as to perform data transmission and information feedback. Related contents in Embodiment 1 may be referred to for this implementation.

In another implementation, the data processing apparatus 600 may carry out functions of the data transmitting unit 601 and the information feedback unit 602 by using an RLC layer, so as to perform data transmission and information feedback. Related contents in Embodiment 2 may be referred to for this implementation.

In this embodiment, the data processing apparatus 600 may be a UE configured with a WT, or may be a WLAN access point configured with a WT. And furthermore, it may also be a stand-alone device configured with a WT, and this disclosure in not limited thereto.

Figure 7:
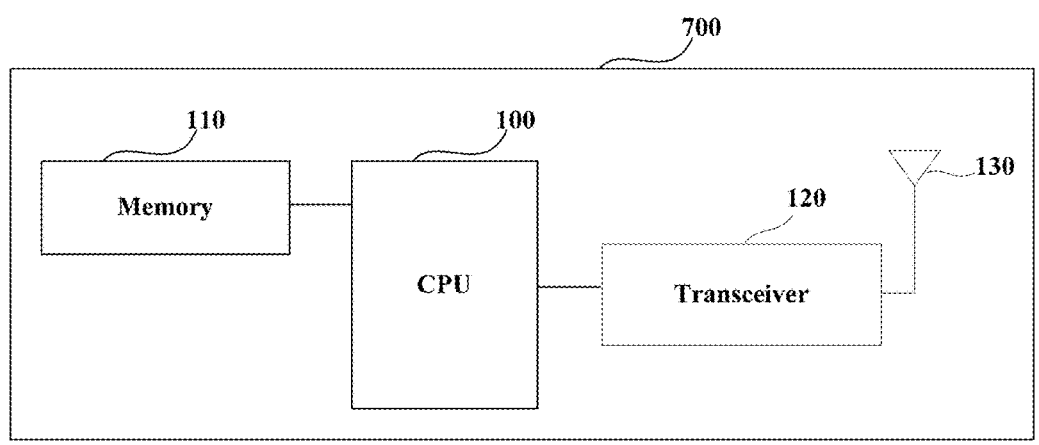
FIG. 7 is a schematic diagram of a WLAN access point or a UE of Embodiment 3 of this disclosure.

FIG. 7 is a schematic diagram of the WLAN access point or UE of the embodiment of this disclosure. As shown in FIG. 7, the WLAN access point or UE 700 may include a central processing unit (CPU) 100 and a memory 110, the memory 110 being coupled to the central processing unit 100. The memory 110 may store various data, and furthermore, it may store a program for information processing, and execute the program under control of the central processing unit 100.

The WLAN access point or UE 700 has a WT, functions of the WT may be integrated into the central processing unit 100. The central processing unit 100 may be configured to carry out the data processing method for LTE and WLAN aggregation described in Embodiment 1 or 2.

Furthermore, as shown in FIG. 7, the WLAN access point or UE 700 may include a transceiver 120, and an antenna 130, etc. Functions of the above components are similar to those in the relevant art, and shall not be described herein any further. It should be noted that the WLAN access point or UE 700 does not necessarily include all the parts shown in FIG. 7, and furthermore, the WLAN access point or UE 700 may include parts not shown in FIG. 7, and the relevant art may be referred to.

It can be seen from the above embodiment that in the LTE and WLAN aggregation system, the highest successfully delivered PDCP SN is provided to the PDCP entity, so as to avoid that the PDCP entity transmits PDCP PDUs of a number exceeding a half of the number of SN spaces. And at the same time, indication on loss of PDCP PDUs may be provided, so as to detect data loss and link failure, thereby efficiently solving a problem that an LLC layer is unable to provide transmission status indication necessary to a PDCP layer.

Embodiment 4

The embodiment of this disclosure provides a communications system, configured to aggregate an LTE link and a WLAN link, with contents identical to those in embodiments 1-3 being not going to be described herein any further.

Figure 8:
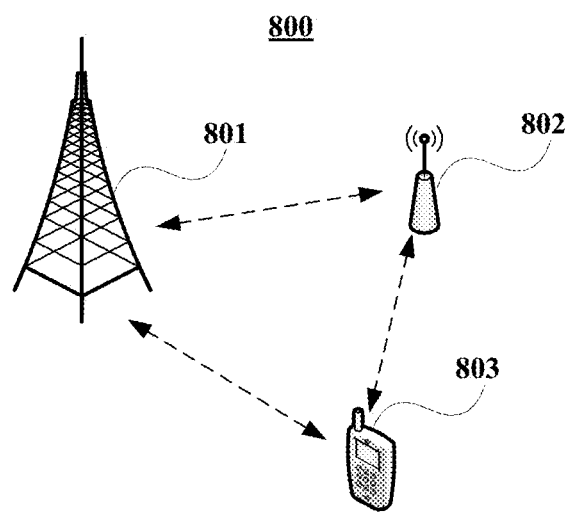
FIG. 8 is a schematic diagram of the communications system of Embodiment 4 of this disclosure.

FIG. 8 is a schematic diagram of the communications system of the embodiment of this disclosure. As shown in FIG. 8, the communications system 800 includes: a base station 801, a WLAN access point 802 and a UE 803.

The base station 801 performs communications with the UE 803 and the WLAN access point 802.

The WLAN access point 802 performs communications with the UE 803 according to a WLAN protocol, the WLAN access point 802 including a first WT interacting with an LTE link; after receiving data transmitted by a PDCP layer in the LTE link, the first WT feeds back highest successfully delivered PDCP sequence number information and/or unsuccessfully delivered PDCP sequence number information to the PDCP layer.

The UE performs communications with the base station 801 according to an LTE protocol and performs communications with the WLAN access point 802 according to a WLAN protocol, the UE 803 including a second WT interacting with the LTE link; after receiving data transmitted by the PDCP layer in the LTE link, the second WT feeds back highest successfully delivered PDCP sequence number information and/or unsuccessfully delivered PDCP sequence number information to the PDCP layer.

An embodiment of the present disclosure provides a computer readable program code, which, when executed in a WLAN access point or a UE, will cause a computer unit to carry out the data processing method for LTE and WLAN aggregation described in Embodiment 1 or 2 in the WLAN access point or UE.

An embodiment of the present disclosure provides a computer readable medium, including a computer readable program code, which will cause a computer unit to carry out the data processing method of LTE and WLAN aggregation described in Embodiment 1 or 2 in a WLAN access point or a UE.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communications combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A data processing method for long term evolution (LTE) and wireless local area network (WLAN) aggregation, comprising:
    receiving, by a WLAN termination (WT), data transmitted by a packet data convergence protocol (PDCP) layer of the LTE, and transmitting the data transmitted by the PDCP layer to a logical link control (LLC) layer of the WLAN after processing;
    wherein the WT performs the data transmission and information feedback by using an adaptation layer;
    wherein the method further comprises:
    receiving an adaptation status PDU by the adaptation layer from the LLC layer of the WLAN; and
    obtaining information identifying one or more bearers and highest successfully delivered adaptation layer sequence numbers of one or more traffics from the adaptation status PDU; wherein the adaptation layer sequence numbers correspond to the PDCP sequence number information.

2. The method according to claim 1, wherein the method further comprises:
    feeding back highest successfully delivered PDCP sequence number information and/or unsuccessfully delivered PDCP sequence number information to the PDCP layer of the LTE.

3. The method according to claim 2, wherein the adaptation layer performs the data transmission by using an adaptation data protocol data unit (PDU) and performs the information feedback by using an adaptation status PDU.

4. The method according to claim 3, wherein the adaptation data PDU at least comprises: information identifying a bearer of a traffic, an adaptation layer sequence numbers specific for the traffic and data of the traffic; and wherein, an adaptation layer sequence number of each of traffics is independently numbered.

5. The method according to claim 3, wherein the adaptation status PDU at least comprises: information identifying a bearer of a traffic and a currently highest successfully delivered adaptation layer sequence number of the traffic;
    or, the adaptation status PDU comprises: information identifying a bearer of a traffic, a currently highest successfully delivered adaptation layer sequence number of the traffic and an NACK field denoting that at least one PDU is unsuccessfully transmitted.

6. The method according to claim 5, wherein the adaptation status PDU comprises status reports of one or more traffics, the one or more traffics being traffics that are changed after feeding back the highest successfully delivered adaptation layer sequence number last time.

7. The method according to claim 2, wherein the receiving, by a WT, data transmitted by a PDCP layer of the LTE, and transmitting the data transmitted by the PDCP layer to an LLC layer of the WLAN after processing, comprises:
receiving the data transmitted by the PDCP layer of the LTE;
encapsulating the data transmitted by the PDCP layer into an adaptation data PDU; and
transmitting the adaptation data PDU to the LLC layer of the WLAN.

8. The method according to claim 2, wherein the method further comprises:
receiving an adaptation data PDU by the adaptation layer from the LLC layer of the WLAN;
obtaining information identifying a bearer of a traffic from the adaptation data PDU; and
processing the data in the adaptation data PDU, and transmitting the processed data to the PDCP layers to which the information identifying the bearer of the traffic corresponds.

9. The method according to claim 8, wherein the method further comprises:
constructing an adaptation status PDU by the adaptation layer in a case where a preset timer does not operate or expires, and feeding back the adaptation status PDU to the LLC layer of the WLAN.

10. The method according to claim 9, wherein a value of the timer is configured by a base station via high-layer signaling;
and in a case where the value of the timer is configured as being 0, the adaptation layer constructs the adaptation status PDU after receiving the adaptation data PDU, and feeds back the adaptation status PDU to the LLC layer of the WLAN; and in a case where the value of the timer is configured as being greater than 0, the adaptation layer periodically constructs the adaptation status PDU according to the value greater than 0, and feeds back the adaptation status PDU to the LLC layer of the WLAN.

11. The method according to claim 8, wherein the method further comprises:
obtaining the adaptation layer sequence number of the traffic from the adaptation data PDU; and
determining whether the adaptation layer sequence number of the traffic is a consecutively received highest adaptation layer sequence number according to the adaptation layer sequence number of the traffic and one or more prestored variables denoting a highest successfully delivered sequence number of the traffic.

12. The method according to claim 11, wherein the method further comprises:
updating the prestored variables in a case where the adaptation layer sequence number of the traffic is a consecutively received highest adaptation layer sequence number, and not updating the prestored variables in a case where the adaptation layer sequence number of the traffic is not a consecutively received highest adaptation layer sequence number;
or, setting the NACK field in the adaptation status PDU in the case where the adaptation layer sequence number of the traffic is not a consecutively received highest adaptation layer sequence number;
or, feeding back data lost information via high-layer signaling or initiating a WLAN link failure report procedure in the case where the adaptation layer sequence number of the traffic is not a consecutively received highest adaptation layer sequence number.

13. The method according to claim 2, wherein the method further comprises:
feeding back the highest successfully delivered adaptation layer sequence numbers respectively to PDCP layers to which the information identifying one or more bearers of the one or more traffics correspond, or feeding back the highest successfully delivered adaptation layer sequence numbers and delivered failure information respectively to the PDCP layers to which the information identifying the one or more bearers of the one or more traffics correspond.

14. A data processing method for long term evolution (LTE) and wireless local area network (WLAN) aggregation, comprising:
receiving, by a WLAN termination (WT), data transmitted by a packet data convergence protocol (PDCP) layer of the LTE, and transmitting the data transmitted by the PDCP layer to a logical link control (LLC) layer of the WLAN after processing; and
feeding back highest successfully delivered PDCP sequence number information and/or unsuccessfully delivered PDCP sequence number information to the PDCP layer of the LTE;
wherein the WT performs the data transmission and information feedback by using a radio link control (RLC) layer; and configures one or more traffics of the WLAN as using functions of the RLC layer.

15. The method according to claim 14, wherein the method further comprises:
configuring the WT at a network side and the WT at a user equipment (UE) side simultaneously with entities and parameters of the RLC layer.

16. A data processing apparatus for LTE and WLAN aggregation, comprising:
a data transmitting unit configured to receive data transmitted by a PDCP layer of the LTE, and transmit the data transmitted by the PDCP layer to an LLC layer of the WLAN after processing;
wherein the data processing apparatus performs the data transmission and information feedback by using an adaptation layer;
wherein the data processing apparatus is configured to:
receive an adaptation status PDU by the adaptation layer from the LLC layer of the WLAN; and
obtain information identifying one or more bearers and highest successfully delivered adaptation layer sequence numbers of one or more traffics from the adaptation status PDU; wherein the adaptation layer sequence numbers correspond to the PDCP sequence number information.

17. The apparatus according to claim 16, wherein the data processing apparatus is a UE configured with a WT, or a WLAN access point configured with a WT.

18. A data processing apparatus for LTE and WLAN aggregation, comprising:
a data transmitting unit configured to receive data transmitted by a PDCP layer of the LTE, and transmit the data transmitted by the PDCP layer to an LLC layer of the WLAN after processing; and an information feedback unit configured to feed back highest successfully delivered PDCP sequence number information and/or unsuccessfully delivered PDCP sequence number information to the PDCP layer of the LTE, wherein the data processing apparatus performs the data transmission and information feedback by using an RLC layer; and configures one or more traffics of the WLAN as using functions of the RLC layer.

19. A communications system for LTE and WLAN aggregation, comprising:
a base station configured to perform communications with a UE and a WLAN access point;
the WLAN access point configured to perform communications with the UE according to a WLAN protocol, the WLAN access point comprising a first WT interacting with an LTE link; wherein after receiving data transmitted by a PDCP layer of the LTE, the first WT transmits the data transmitted by the PDCP layer to an LLC layer of the WLAN after processing; and
the UE configured to perform communications with the base station according to an LTE protocol and perform communications with the WLAN access point according to a WLAN protocol, the UE comprising a second WT interacting with the LTE link;
wherein after receiving data transmitted by the PDCP layer of the LTE, the second WT transmits the data transmitted by the PDCP layer to an LLC layer of the WLAN after processing;
wherein the first WT performs the data transmission and information feedback by using an adaptation layer;
wherein the first WT is further configured to:
receive an adaptation status PDU by the adaptation layer from the LLC layer of the WLAN; and
obtain information identifying one or more bearers and highest successfully delivered adaptation layer sequence numbers of one or more traffics from the adaptation status PDU; wherein the adaptation layer sequence numbers correspond to the PDCP sequence number information;
or wherein the first WT performs the data transmission and information feedback by using a radio link control (RLC) layer;
wherein the second WT performs the data transmission and information feedback by using an adaptation layer;
wherein the second WT is further configured to:
receive an adaptation status PDU by the adaptation layer from the LLC layer of the WLAN;
obtain information identifying one or more bearers and highest successfully delivered adaptation layer sequence numbers of one or more traffics from the adaptation status PDU; wherein the adaptation layer sequence numbers correspond to the PDCP sequence number information; and
feed back the highest successfully delivered adaptation layer sequence numbers respectively to PDCP layers to which the information identifying the one or more bearers of the one or more traffics correspond, or feeding back the highest successfully delivered adaptation layer sequence numbers and delivered failure information respectively to the PDCP layers to which the information identifying the one or more bearers of the one or more traffics correspond;
or wherein the second WT performs the data transmission and information feedback by using a radio link control (RLC) layer.

* * * * *